J. H. BROWN.
FUEL VALVE FOR INTERNAL COMBUSTION ENGINES.
APPLICATION FILED NOV. 8, 1918.
1,315,462.
Patented Sept. 9, 1919.
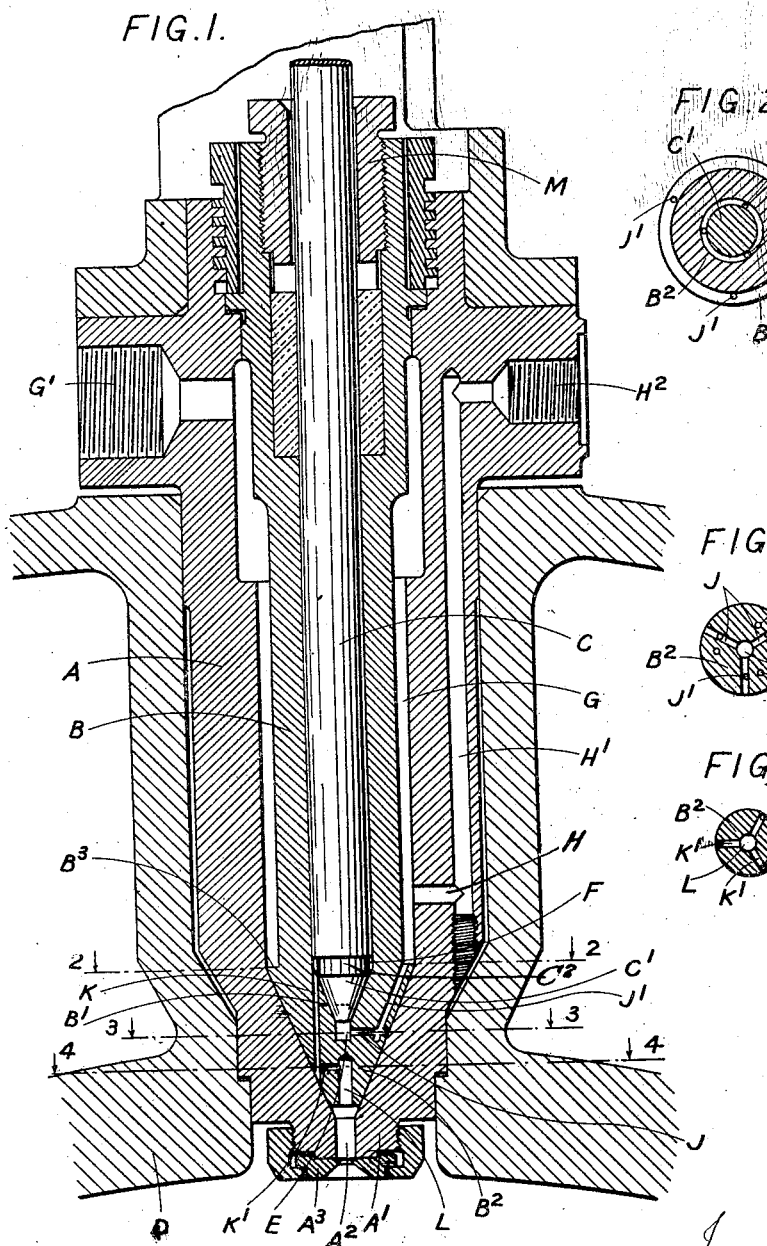
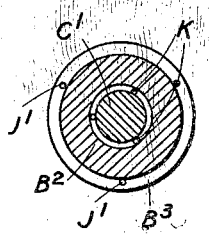
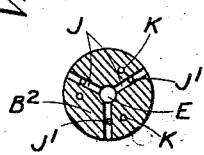
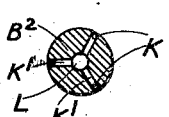
Inventor.
James Henry Brown,
By Foster, Freeman, Watson & Coit
Attorneys.

UNITED STATES PATENT OFFICE.

JAMES HENRY BROWN, OF COWES, ISLE OF WIGHT, ENGLAND, ASSIGNOR TO J. SAMUEL WHITE & COMPANY, LIMITED, OF EAST COWES, ISLE OF WIGHT, ENGLAND.

FUEL-VALVE FOR INTERNAL-COMBUSTION ENGINES.

1,315,462.   Specification of Letters Patent.   Patented Sept. 9, 1919.

Application filed November 8, 1918. Serial No. 261,655.

*To all whom it may concern:*

Be it known that I, JAMES HENRY BROWN, subject of the King of England, and residing at Cowes, Isle of Wight, in England, have invented certain new and useful Improvements in Fuel-Valves for Internal-Combustion Engines, of which the following is a specification.

This invention relates to fuel valves for internal combustion engines more especially those of the Diesel type and has for its object to provide a construction in which will be obtained an efficient pulverization of the fuel and a thorough mixing of the fuel with the air by means of which the fuel is injected into the cylinder, while at the same time economy in the air employed, easier operation of the valve due to reduction of mean pressure on the gland and other advantages result.

According to this invention the fuel is injected by air into a chamber through radially arranged passages in the walls thereof so that the inflowing streams will meet about the center of the chamber. A valve controls the flow of mingled fuel and air from this first chamber to a second and conveniently similar chamber into which the mixture of fuel and air enters through radially arranged passages so that the inflowing streams will meet about the center of this chamber. The two chambers are conveniently formed cylindrical and disposed coaxially within the member or casing in which the valve is seated and can reciprocate. The valve seat which is of substantial area is arranged so that the valve will close the delivery outlet from the first chamber which is formed at the end of this chamber so that the interior of the latter is thus unobstructed. The mingled fuel and air pass over the valve seating and through openings therein to the radial passages which deliver the mixture into the second chamber whence the mixture is injected into the engine cylinder. The formation and arrangement of each chamber is such that it is closed at one end and open at the other the end of the first chamber opening into a passage the end of which is formed as the valve seat while the end of the second chamber opens or leads directly or indirectly into the engine cylinder. The valve reciprocates in the passage at the end of which is its seating this passage being suitably formed in the casing member. The radial passages leading into each chamber are preferably arranged so that they are not directly opposed but so that the inflowing stream from one radial passage will be directed toward a part of the wall of the chamber between the orifices of two other passages.

By employing this construction effective pulverization of the fuel and thorough mingling of the fuel and air is obtained while there is economy in the air used for injection purposes. Further the valve is so arranged that the risk of leakage past the gland is minimized and the air pressure on that gland is reduced. Consequently it is possible to obtain easier and more certain operation of the valve as the valve can be given a seating of substantial size which reduces the tendency to leakage of air and obviates the necessity for undesirable tightness in the gland. Since the flow of fuel and air can take place with such reasonable freedom while efficient mixing and pulverization is obtained it is not necessary to make such a heavy demand on the compressed air supply as with previous known constructions of valves of this type.

The accompanying drawings illustrate by way of example one construction of fuel valve in accordance with the present invention. In these drawings, Figure 1 is a longitudinal sectional elevation of the improved valve.

Fig. 2 is a transverse section through the valve and casing on the line 2—2 of Fig. 1.

Fig. 3 is a similar section taken on the line 3—3 of Fig. 1.

Fig. 4 is again a similar section of the line 4—4 of Fig. 1, all three sections being viewed looking in the direction of the arrows.

Like letters indicate like parts throughout the drawings.

The complete valve comprises an outer casing A within which is fixed a pulverizer member B while the valve itself is carried on a spindle C which reciprocates within the member B. The body of the outer casing A is formed externally cylindrical and reduced in diameter toward the end A′ in which is the delivery passage $A^2$ through which the mingled fuel and air enters the cylinder D. At the orifice of the opening $A^2$ the usual flame plate A³ is preferably arranged in some convenient manner as shown in Fig. 1. The casing is suitably mounted and fixed in an opening through the wall of the cylinder D and water jacket thereof.

The valve spindle C is formed cylindrical and of suitable length the outer end being constructed or arranged in some convenient known manner so as to be acted on by a spring and by a lever in the usual way in order to effect reciprocation of the spindle and lift the valve off its seat. The valve which is formed at the inner end of the spindle C comprises a coned portion C' and a cylindrical part C² of less diameter than the spindle C. The latter is a sliding fit within the hollow member B and the inner end of the interior of the member B is coned as at B' to form a seating for the valve C'. At the smaller end of this coned seating is formed in the member B a cylindrical chamber E the open end of which is closed by the truncated end of the conical valve C'. The seating B' and the valve C' which engages it are preferably formed of substantial area. As will be apparent from Fig. 1, wherein the valve C' is shown seated, the reduced cylindrical portion C² which lies behind the valve on its spindle C provides an annular space F around the end portion of the spindle C and between it and the surrounding inner wall of the member B.

The pulverizer member B throughout the greater part of its length is cylindrical but its inner end B² is externally conical and engages a corresponding coned seating at the inner end of the casing A. The cylindrical part of the member B is of less diameter than the cylindrical interior of the casing A and a shoulder B³ is formed at the end of the cylindrical part B where the conical portion B² commences. There is thus formed a cylindrical space or chamber G between the main part of the member B and the casing A. The injection air enters this chamber G through an opening G' formed laterally in the outer part of the casing A. Fuel also enters the chamber G through a short radial passage H and a longitudinal passage H' both of which are formed in the body of the casing A and through an opening H² arranged laterally at the outer end of the casing A and conveniently disposed opposite to the air inlet G'.

Leading radially into the central chamber E, which may be termed the first mixing chamber, are a series of passages J conveniently three in number and equally spaced apart. These radial passages J are formed in the conical end portion B² of the member B and each of them is in communication by an inclined passage J', also formed in the coned part B², with the annular chamber G whence fuel and injection air can pass through the passages J' and J into the chamber E. The radial passages J are so arranged that the fuel and air entering the mixing chamber E from one of these passages will be directed toward that part of the opposite wall of the chamber E which lies between the other two passages J. Consequently the streams of mingled fuel and air issuing simultaneously from the three radial passages will all meet and impinge against each other about the center of the mixing chamber E. The outlet from this chamber E is closed by the valve C' and as will be seen the whole length of the seating B' is operative in effecting this closure.

From or through the valve seating B' and at or toward that part of the seating which is remote from the mixing chamber E lead a series of longitudinal passages K preferably three in number. These passages may be variously arranged but conveniently as shown they run through the conical part B² of the member B parallel to the axis of the valve spindle C. The other ends of these passages K lead by way of three radial passages K' into a centrally disposed cylindrical chamber L which may be termed the second mixing chamber. This chamber is coaxial with the first mixing chamber E but separated therefrom by a wall which forms part of the conical portion B² of the member B within which these chambers are constructed. The three radial passages K' which are equally spaced apart thus lead into the second mixing chamber L in the same way as the radial passages J lead into the first mixing chamber E so that the mingled fuel and air issuing from each of the radial passages K' will be directed toward the opposite wall of the chamber L between the other two passages and the three inflowing streams will consequently meet about the center of the chamber L. The chamber L extends to and has its end in the truncated end of the conical portion B² of the member B and thus the chamber L leads into the passage A² which as described above is formed in the end of the casing A and opens into the cylinder.

As mentioned the injection air and fuel enter respectively through the inlets G' and H² and pass into the cylindrical chamber G whence when the valve C' is lifted streams of fuel and air enter the first mixing chamber E through the radial passages J. This results in pulverization of the fuel and its intimate mixture with the air as the radial streams meet about the center of the chamber E. The mixture then passes over the whole length of the valve seating B' to the passages K which are traversed and the mingled fuel and air then enters the second mixing chamber L through the passages K' in three radial streams so that a second thorough intermixture of air and fuel and pulverization of the latter is effected. Finally the mixture which issues from the end of the chamber L passes through the passage A² and enters the cylinder. It is to be noted that the valve C' and its seat B' are so arranged that the flow of fuel and air through the passages J into the first mixing chamber E and the pulverization and mixing which takes place in this chamber is unobstructed by the valve and when the latter is lifted off its seat there is a free flow for the mingled fuel and air through the passages K and K' to the second mixing chamber L where again an unobstructed inflow and mixing of the streams can take place. As the length of the valve C' and its seating B' are of substantial dimensions the supply of fuel and air can be effectively shut off when the valve is seated and leakage past the valve is obviated. It is possible with this construction to construct the valve spindle C with a considerable length throughout which its outer surface is in intimate contact with the inner surface of the member B in which the spindle reciprocates so that the tendency for air to leak from the valve past the spindle C to the gland M through which the spindle passes is minimized. Consequently there is no occasion for excessive tightness in this gland and as a result the valve can reciprocate more freely.

The form and disposition of the mixing chambers E and L and of the passages J J' and K K' leading respectively thereinto as also the number of these passages may be varied as found desirable.

The details of construction may be modified to suit requirements.

What I claim as my invention and desire to secure by Letters Patent is:—

1. In a fuel valve for an internal combustion engine the combination of a chamber into which fuel is injected by air under pressure through radial passages so that the inflowing streams will meet about the center of the chamber, a second chamber into which the mingled fuel and air after leaving the first chamber can enter through radial passages, a valve controlling the flow of fuel and air from the first chamber to the second chamber, and a passage through which the mingled fuel and air can issue from the second chamber into the cylinder as set forth.

2. In a fuel valve for an internal combustion engine the combination of a cylindrical chamber into which fuel is injected by air under pressure through radial passages so that the inflowing streams will meet about the center of the chamber, a second cylindrical chamber similar to the first chamber and arranged coaxially therewith into which second chamber the mingled fuel and air after leaving the first chamber can enter through radial passages, a valve controlling the flow of fuel and air from the first chamber to the second chamber, and a passage through which the mingled fuel and air can issue from the second chamber into the cylinder as set forth.

3. In a fuel valve for an internal combustion engine the combination of a chamber into which fuel is injected by air under pressure through radial passages so that the inflowing streams will meet about the center of the chamber which is provided at one end with an opening through which the mingled fuel and air can issue, a valve seat formed in this opening, a valve adapted to engage this seat, a second chamber into which the mingled fuel and air after leaving the first chamber can enter through radial passages, and a passage through which the mingled fuel and air can issue from the second chamber into the cylinder as set forth.

4. In a fuel valve for an internal combustion engine the combination of a chamber into which fuel is injected by air under pressure through radial passages so that the inflowing streams will meet about the center of the chamber which is provided at one end with an opening through which the mingled fuel and air can issue, a valve seat formed in this opening, a valve adapted to engage this seat, a second chamber into which the mingled fuel and air after leaving the first chamber can enter through radial passages, a plurality of passages extending from the opening from the first chamber adjacent to the valve seat to the several radial passages which lead into the second chamber, and a passage through which the mingled fuel and air can issue from the second chamber into the cylinder as set forth.

5. In a fuel valve for an internal combustion engine the combination of a member having a hollow body and closed end, two separate and coaxially arranged cylindrical chambers formed in the closed end portion of this member each of these chambers being closed at one end and having an opening at the other end and the opening at the end of the first of these chambers leading into the hollow body of the member, a valve seat formed in this opening at the end of the hollow part of the member, a passage leading from the opening at the end of the second chamber into the cylinder, a valve adapted to reciprocate in the hollow body of the member and engage the seating at the end thereof, radial passages through which fuel and air are delivered under pressure into the first chamber, radial passages through which the mingled fuel and air enter the second chamber, and passages leading from points adjacent to the valve seat to the radial passages of the second chamber as set forth.

6. In a fuel valve for an internal combustion engine the combination of an outer casing, a member having a hollow body and closed end this member being so formed as to fit into the outer casing and provide an annular chamber between the member and the casing, two separate and coaxially arranged cylindrical chambers formed in the closed end portion of this member each of these chambers being closed at one end and having an opening at the other end and the opening at the end of the first of these chambers leading into the hollow body of the member, a valve seat formed in this opening at the end of the hollow part of the member, a passage leading from the opening at the end of the second chamber into the cylinder, a valve adapted to reciprocate in the hollow body of the member and engage the seating at the end thereof, radial passages extending between the annular chamber around the hollow member and the first chamber through which fuel and air delivered under pressure into the annular chamber can pass into the first chamber, radial passages through which the mingled fuel and air enter the second chamber, and passages leading from points adjacent to the valve seat to the radial passages of the second chamber as set forth.

7. In a fuel valve for an internal combustion engine the combination of a member having a hollow body one end of which is closed while at the other end is a gland, two separate and coaxially arranged cylindrical chambers formed in the closed end portion of this member each of these chambers being closed at one end and having an opening at the other end and the opening at the end of the first of these chambers leading into the hollow body of the member, a valve seat formed in this opening at the end of the hollow part of the member, a passage leading from the opening at the end of the second chamber into the cylinder, a valve adapted to engage the seating at the end of the hollow body of the member and disposed at the end of a spindle which fits and can reciprocate within the hollow body of the member the valve spindle extending through the gland at the opposite end of this member, radial passages through which fuel and air are delivered under pressure into the first chamber, radial passages through which the mingled fuel and air enter the second chamber, and passages leading from points adjacent to the valve seat to the radial passages of the second chamber as set forth.

8. In a fuel valve for an internal combustion engine the combination of an outer casing, a member having a hollow body one end of which is closed while at the other end is a gland this member being so formed as to fit into the outer casing and provide an annular chamber between the member and the casing, two separate and coaxially arranged cylindrical chambers formed in the closed end portion of this member each of these chambers being closed at one end and having an opening at the other end and the opening at the end of the first of these chambers leading into the hollow body of the member, a valve seat formed in this opening at the end of the hollow part of the member, a passage leading from the opening at the end of the second chamber into the cylinder, a valve adapted to engage the seating at the end of the hollow body of the member and disposed at the end of a spindle which fits and can reciprocate within the hollow body of the member the valve spindle extending through the gland at the opposite end of this member, radial passages extending between the annular chamber around the hollow member and the first chamber through which fuel and air delivered under pressure into the annular chamber can pass into the first chamber, radial passages through which the mingled fuel and air enter the second chamber, and passages leading from points adjacent to the valve seat to the radial passages of the second chamber as set forth.

In testimony whereof I have signed my name to this specification.

JAMES HENRY BROWN.